United States Patent [19]

Sami et al.

[11] 4,036,188
[45] July 19, 1977

[54] CARBURETOR EQUIPPED WITH A COOLING SYSTEM

[75] Inventors: Hiroshi Sami; Kaoru Taira; Teruo Kumai, all of Toyota, Japan

[73] Assignee: Toyota Jidosha Kogyo Kabushiki Kaisha, Toyota, Japan

[21] Appl. No.: 522,131

[22] Filed: Nov. 8, 1974

[30] Foreign Application Priority Data

July 18, 1974 Japan .................. 49-82482

[51] Int. Cl.² ........................... F01P 1/06
[52] U.S. Cl. ................. 123/41.31; 123/41.22; 123/122 H; 123/122 R; 165/30; 165/51
[58] Field of Search ............ 123/122 R, 41.22, 41.31, 123/122 H; 165/52, 51, 30

[56] References Cited

U.S. PATENT DOCUMENTS

| | | | |
|---|---|---|---|
| 1,250,912 | 12/1917 | McCorkle | 123/41.22 |
| 1,335,391 | 3/1920 | Rayfield | 123/41.22 |
| 1,741,464 | 12/1929 | Hunt | 123/41.22 |
| 1,903,446 | 4/1933 | Firth | 123/122 H |
| 2,084,940 | 6/1937 | Caldwell | 123/41.22 |
| 2,224,740 | 12/1940 | Melcher | 165/51 |
| 2,508,988 | 5/1950 | Bradley | 165/30 |
| 2,560,220 | 7/1951 | Graziano | 123/122 H |
| 2,716,396 | 8/1955 | Johnson | 123/41.31 |
| 2,807,245 | 9/1957 | Unger | 123/41.31 |
| 3,253,647 | 5/1966 | Deshaies | 165/51 |
| 3,332,476 | 7/1967 | McDougal | 165/51 |
| 3,732,696 | 5/1973 | Masaki | 123/122 H |
| 3,780,714 | 12/1973 | Dillow | 165/51 |
| 3,828,747 | 8/1974 | Nambu | 123/122 H |
| 3,845,749 | 11/1974 | Alquist | 123/122 H |
| 3,850,152 | 11/1974 | Hollins | 123/122 H |

*Primary Examiner*—Carroll B. Dority, Jr.
*Assistant Examiner*—Daniel J. O'Connor
*Attorney, Agent, or Firm*—Birch, Stewart, Kolasch and Birch

[57] ABSTRACT

A carburetor equipped with a cooling system composed of cooling fluid passages incorporated in the carburetor flange and/or heat insulator mounted below the flange portion, said cooling system being supplied with cooling fluid only for a predetermined duration from the instant of opening the ignition switch to protect the carburetor casing from being overheated by an intake manifold incorporating exhaust gas heating.

4 Claims, 3 Drawing Figures

CARBURETOR EQUIPPED WITH A COOLING SYSTEM

BACKGROUND OF THE INVENTION

1. Field of the Invention

The present invention relates to a carburetor and, more particularly, an improvement of a carburetor for use with an internal combustion engine which incorporates intake manifold heating by exhaust gases.

2. Description of the Prior Art

In an internal combustion engine, especially an engine of a cross flow type, wherein the intake manifold, especially a riser portion thereof is heated by exhaust gases to improve startability and warming-up performance of the engine, there is a problem in that if the engine stops after it has been warmed-up, the carburetor receives heat from the riser portion by radiation and conduction, causing considerable increase in temperature of a float chamber and a flange portion of the carburetor, whereby vapour lock might occur in the fuel system over a wide range, including the carburetor. If such vapour lock occurs, problems such as rough idling of the engine due to misfire during its restarting and an increase of the combustible components in the exhaust gases, etc., are produced.

SUMMARY OF THE INVENTION

Therefore, it is an object of the present invention to solve the aforementioned problems and to provide an improved carburetor which does not cause vapor lock when the engine has stopped after its warming-up even when the carburetor is used with an internal combustion engine which incorporates intake manifold heating by exhaust Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

According to the present invention, the abovementioned object is accomplished by a carburetor incorporating a fluid cooling system for a carburetor casing, said cooling system being circulated with cooling fluid only for a predetermined duration from the instant when the ignition switch is opened.

If the ignition switch is opened to stop an engine after it has been warmed-up, said engine incorporating a carburetor equipped with the abovementioned fluid cooling system, cooling fluid is circulated through the cooling system of the carburetor for a predetermined duration from the instant the ignition switch is opened, whereby the casing of the carburetor is cooled so as not to cause an extraordinary high temperature of the float chamber and the carburetor flange portion, whereby the danger of causing a vapor lock in the fuel system is eliminated. If the engine has stopped by chance due to stalling, etc. with the ignition being kept closed, the driver will generally close a starter switch while keeping the ignition switch closed in order to restart the engine and, in this case, the danger that the float chamber and the carburetor flange portion might be heated-up to an extraordinarily high temperature during a very short period before the engine is restarted should be very low. Therefore, the system of the present invention to start the circulation of the cooling fluid upon the opening of the ignition switch will attain the abovementioned object almost completely.

According to a particular feature of the present invention, in view of the fact that the flange portion of the carburetor casing is apt to be especially heated, the abovementioned cooling system may preferably include a cooling water passage formed in the flange portion of the carburetor casing, said passage being circulated with cooling water.

According to another particular feature of the present invention, said fluid cooling system may comprise a cooling water passage formed in the heat insulator member mounted below the carburetor, said passage being adapted to be circulated with cooling water.

According to still another feature of the present invention, said fluid cooling system may be an independent system including its own cooling tank and circulation pump, said system being separated from the engine cooling system. Since the amount of heat to be removed by the cooling system of the present invention from the carburetor casing is relatively small, the cooling water tank of said independent system may be of a small capacity and such a cooling tank will not require any radiator even when said independent system is formed as a closed cycle if the tank is mounted at a proper position within the engine room where the temperature is relatively low and some ventilation is available.

BRIEF DESCRIPTION OF THE DRAWING

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENT

Figure 1:
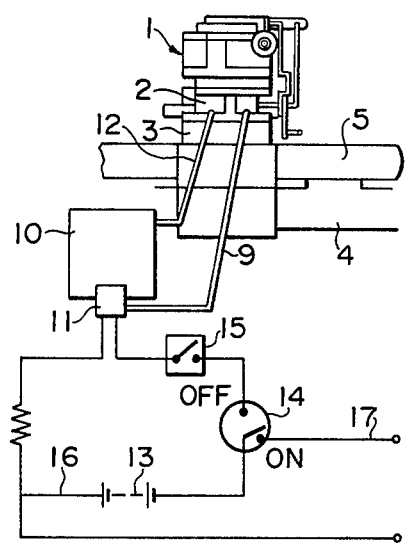
FIG. 1 is a diagrammatical view of an embodiment of the carburetor equipped with the cooling system according to the present invention.

Referring to FIG. 1, 1 is a carburetor having a flange portion 2 which is connected with a heat insulator which in turn is connected to an intake manifold 5 adapted to be heated by the exhaust gas passing through an exhaust manifold 4. In the embodiment shown in FIG. 1, a cooling water passage to operate as a water cooling system is incorporated in the carburetor flange portion 2, said passage being formed as shown by 6 in FIG. 2. The cooling water passage 6 incorporated in the flange portion 2 has an inlet 7 and an outlet 8 for cooling water, said inlet 7 being adapted to be supplied with cooling water through a pipe 9 from a cooling water tank 10 by the action of a cooling water circulation pump 11. The cooling water which has passed through the cooling water passage 6 is led out from the outlet 8 and returned to the water tank 10 by way of a pipe 12.

The cooling water circulation pump 11 is adapted to be driven selectively by a power circuit 16 which includes a direct current source 13, an ignition switch 14 and a timer 15. When the ignition switch 14 is closed, an ignition circuit 17 is closed, while the power circuit 16 for the circulation pump is opened. To the contrary, if the ignition switch 14 is opened, the ignition circuit 17 is opened to stop the engine, while the power circuit 16 for the circulation pump is now closed to start the operation of the circulation pump 11, thus causing circulation of cooling water through the cooling water passage 6. The timer 15 is set to a predetermined duration at the instant when the circuit 16 is closed and is adapted to open when the predetermined duration has lapsed. Therefore, the cooling water circulation through the passage 6 is effected only for a predetermined period set by the timer 15 from the instant when the engine stops.

Figure 2:
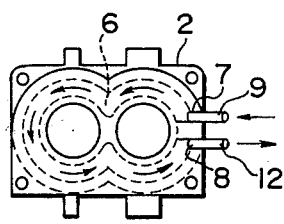
FIG. 2 is a plan view of the carburetor flange portion in which cooling water passages are incorporated; and, FIG. 3 is a plan view of a heat insulating member of the carburetor wherein cooling water passages are incorporated.
Figure 3:
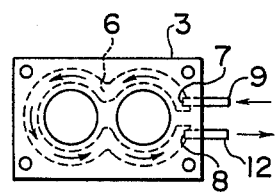

FIG. 3 is a view similar to FIG. 2 but shows another embodiment wherein the cooling water passage is formed in the heat insulator 3. It will be obvious that even when the cooling water passage has been incorporated in the heat insulator 3, the abovementioned selective circulation explained with reference to FIGS. 1 and 2 may be effective quite in the same manner. In FIG. 3, portions corresponding to those shown in FIG. 2 are designated by the same reference numerals.

Furthermore, although two embodiments of incorporating the water cooling passage in the flange portion 2 and the heat insulator 3 have been explained separately, these two embodiments may be simultaneously incorporated into a carburetor structure so that the flange portion and the heat insulator are simultaneously circulated with cooling water when required.

The cooling water tank 10 for a common automobile may be of a capacity of 1-2 liters and may preferably be mounted at a proper position in the engine room where the temperature is relatively low and good ventilation is available. The timed duration to be set by the timer 15 should preferably be a few minutes.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A carburetor in an internal combustion engine which incorporates intake manifold heating by exhaust gases to improve startability and warming-up performance of the engine, comprising a fluid cooling system means for a carburetor casing, said cooling system means including a pumping means for a cooling fluid and a power circuit means for said pumping means, said power circuit means incorporating an engine ignition switch and a timer and adapted to drive said pumping means for only a predetermined duration from the instant when said ignition switch is opened.

2. The carburetor according to claim 1, wherein said fluid cooling system means comprises a cooling water passage formed in a flange portion of the carburetor casing.

3. The carburetor according to claim 1, wherein the fluid cooling system means comprises a cooling water passage formed in a heat insulator mounted below the carburetor.

4. The carburetor according to claim 1, wherein said fluid cooling system means is an independent system including its own cooling tank and circulation pump, said system being separated from an engine cooling system.